United States Patent [19]

Humble

[11] Patent Number: 4,825,045

[45] Date of Patent: Apr. 25, 1989

[54] SYSTEM AND METHOD FOR CHECKOUT COUNTER PRODUCT PROMOTION

[75] Inventor: David R. Humble, Deerfield Beach, Fla.

[73] Assignee: Advance Promotion Technologies, Inc., Deerfield Beach, Fla.

[21] Appl. No.: 889,801

[22] Filed: Jul. 24, 1986

[51] Int. Cl.$^4$ ............................................. G06K 15/00
[52] U.S. Cl. ................................... 235/383; 235/487; 235/432; 364/405
[58] Field of Search ............... 235/375, 383, 462, 432, 235/385, 381, 382, 494, 487, 493; 364/400, 401, 405, 478, 479

[56] References Cited

U.S. PATENT DOCUMENTS

| | | |
|---|---|---|
| 3,959,624 | 5/1976 | Kaslow ................................ 235/487 |
| 4,419,573 | 12/1983 | von Geldern ................... 235/385 X |
| 4,554,446 | 11/1985 | Murphy et al. ...................... 235/487 |
| 4,658,125 | 4/1987 | Kachi et al. ........................ 235/493 |
| 4,674,041 | 6/1987 | Lemon et al. ...................... 235/381 |

Primary Examiner—Roy N. Envall, Jr.
Attorney, Agent, or Firm—Robin, Blecker & Daley

[57] ABSTRACT

An expanded display unit for communication with a customer in a supermarket checkout facility is furnished with information from a system responsive to UPC signals provided by a scanner. Such system discerns selected products selected for purchase from such UPC signals, such products being those in connection with which a promotional plan has been preestablished, either for such products or other products. The system then provides information implementing the promotional plan to the display unit, which may be customer-interactive for the dispensing of coupons or the like.

6 Claims, 2 Drawing Sheets

SYSTEM AND METHOD FOR CHECKOUT COUNTER PRODUCT PROMOTION

FIELD OF THE INVENTION

This invention relates generally to product merchandizing and pertains more particularly to systems and methods for the promotion of products at a checkout counter.

BACKGROUND OF THE INVENTION

Checkout systems in widespread use in supermarkets presently include a so-called "P.O.S" unit which includes a display window for communicating to the customer the identification of an article being checked out by a checker and the price of the article. Typically, the checker passes the article over a universal product code (UPC) scanner. The UPC is thus read and a digital signal indicative of the code is furnished to a computer whose memory includes such identification and price data in storage in address correspondence with the code signal.

In such known systems, various other use is made of the UPC derived computer information. One is price totalization and preparation of a complete record of the customer's purchases. Another is inventory control, wherein the computer decrements existing inventory in accordance with each UPC reading.

While such computer-assistance greatly enhances checkout, applicant is of the view that presently known systems and practices such as described fall far short of the needs of the marketplace. In particular, the communication with the customer is minimal, being limited to the simple window P.O.S. display and the checkout record. Clearly, the prior efforts do not address desired promotional activity.

SUMMARY OF THE INVENTION

The present invention has as its primary object the provision of improved product checkout systems and methods.

A more particular object of the invention is to provide enhanced computer-assisted product checkout and promotion in supermarkets and like facilities.

In attaining these and other objects, the invention provides an expanded display unit for communication with a customer in lieu of the P.O.S. unit. The display unit is furnished with information from a system responsive to UPC signals provided by a scanner. Such system discerns selected products selected for purchase from such UPC signals, such products being those in connection with which a promotional plan has been preestablished, either for such products or other products. The system then provides information implementing the promotional plan to the display unit, which may be customer-interactive for the dispensing of coupons or the like.

In preferred configuration, the system and method of the invention includes a plurality of first circuit means each for storage of the UPC information corresponding to a given different product. A plurality of comparators are provided, each receiving the output of a distinct one of the first circuit means and all commonly receiving the output of the product scanner indicative of the article selected for purchase and then being UPC-scanned. Each comparator provides an output signal upon correspondence between the input signals thereto, such output being indicative of a customer purchasing event of interest in connection with the preestablished promotional plan. The comparator output signals are employed to derive a promotional message from suitable storage and convey same to the display unit.

The foregoing and other features of the invention will be further understood from the following detailed description of preferred embodiments and practices and from the drawings wherein like reference numerals identify like components and parts throughout.

DESCRIPTION OF PREFERRED EMBODIMENTS AND PRACTICES

Figure 1:
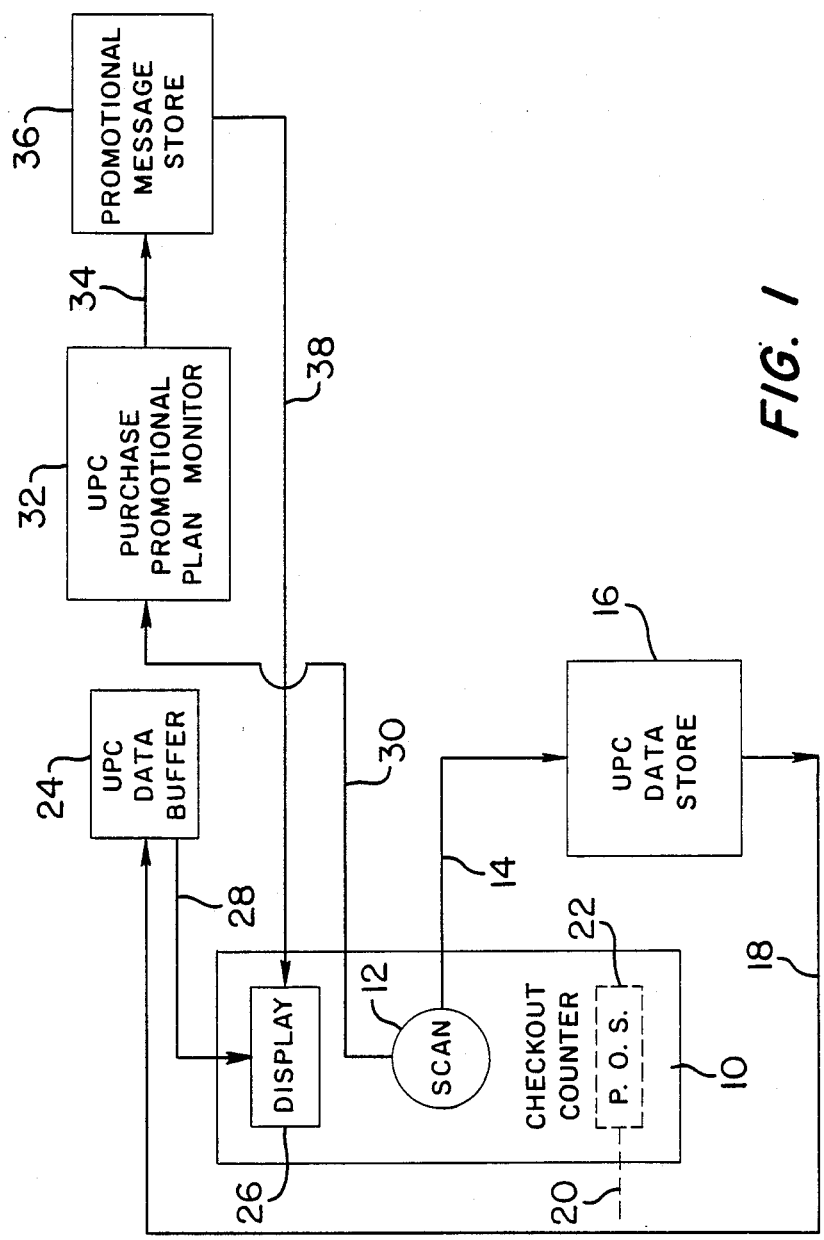

Referring to FIG. 1, checkout counter 10 includes the customary UPC scan unit 12, whose output signals are conveyed over line 14 to UPC data store 16. Store 16 is of known configuration in widespread use, being a computer-implemented look-up table having product description and price correlated with product UPC. In known checkout systems, this information is furnished by lines 18 and 20 to P.O.S. unit 22, line 20 and unit 22 being shown in phantom, since they need not be employed in practice under the invention herein.

Line 18 furnishes the output of store 16 to UPC data buffer 24, which may apply description and price to promotional display unit 26 over line 28. The output of scan unit 12 is further furnished over line 30 to UPC purchase/promotional plan monitor 32, which is presettable, in connection with the promotional plan to be implemented, to have certain UPC signals therein in memory.

Comparison is effected in monitor 32 as between the UPC of the actual product purchased by the customer and then being scanned by the checker and the plurality of UPCs placed in the memory of monitor 32. Upon positive comparison determination, monitor 32 activates the corresponding one of its output lines 34, which are connected as inputs to promotional message store 36.

Store 36, which may be configured as a video disk memory, contains product promotional messages selected to have merchandizing relationship with the products whose UPCs are contained in monitor 32. Upon activation of lines 34, store 36 furnishes promotional messages to output line 38 which conveys same to promotional display unit 26 for presentation to the customer.

Display unit 26 may be a video (CRT) device and may include a customer-interactive screen. A coupon dispenser (not shown) may be associated with unit 26 and operative responsively to customer screen interaction.

By way of example of a promotional plan with which the system of FIG. 1 may be used, the invention contemplates various measures of promotion, such as the display of a graphic message relating to the product actually selected for purchase, the display of offers of discount for future purchase of the product actually selected for purchase, the display of offers of discount for present or future purchase of products other than the product actually selected for purchase, the display of offers of general discount coupons for products, offers of a credit to the account of the customer, etc., all for the presentation through display unit 26 upon such discernment of the corresponding UPC code.

Figure 2:
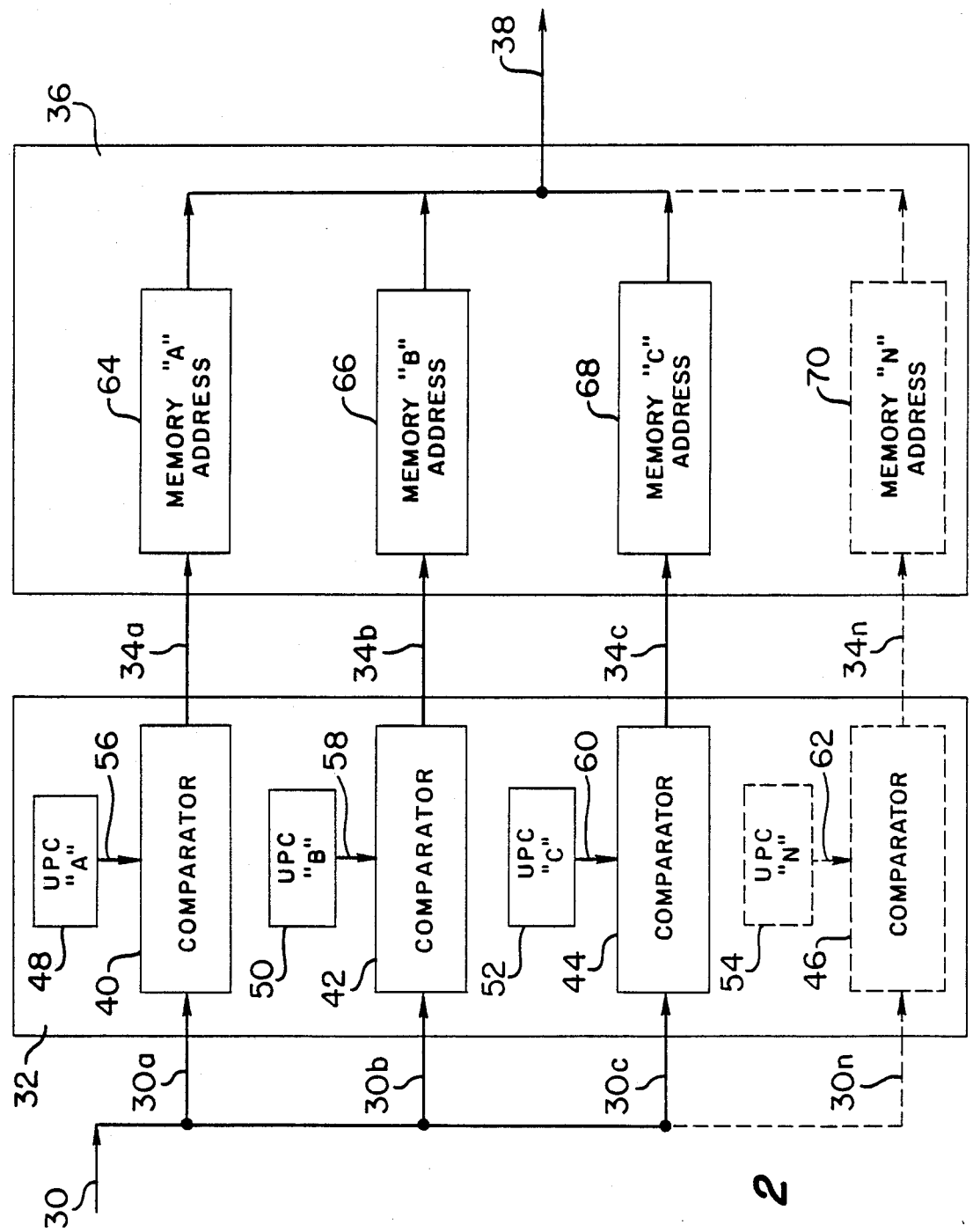

Referring now to FIG. 2, monitor 32 includes comparators 40, 42, 44 and 46. Each comparator has a common input from scan unit 12, delivered over line 30 and lines 30a, 30b, 30c and 30n. Buffers 48, 50, 52 and 54 are associated individually with the comparators providing inputs thereto over lines 56, 58, 60 and 62, indicative of UPCs A, B, C and N.

Comparators 40 through 46 are connected individually to memory location addresses 64, 66, 68 and 70 in promotional message store 36 over lines 34a, 34b, 34c, and 34d. Output lines 38a, 38b, 38c and 38d are connected in common to line 38 for conveyance of stored messages to the promotional display of FIG. 1.

A plurality of comparators may be connected in common to each of the input lines to store 36 of FIG. 2, each such comparator having input thereto of a different UPC of various different brands of a common type of product.

In a more specific example of a promotional plan implemented by the invention, assume that the customer has selected Brand X pea soup and that product is part of the promotional plan. The UPC for this product is pre-entered in the system UPC monitor and comparison is made of it and the scanned UPC. The result will be positive and the memory may first provide on display 26 an advertisement in the form of a computer generated graphic message or a repeat of a network type advertising message generated from a video disk. The customer might be rewarded with a coupon upon touching such as the item price, also displayed, or by contact with any preselected portion of the display screen. Alternatively, the memory might display promotional information respecting another Brand X soup type, or other product. Depending upon the purchase volume of the Brand X pea soup, the promotional scheme might offer the consumer a free purchase thereof.

As will be seen from the foregoing, the invention provides a system for the checkout of products bearing sensible codes indicative thereof and for the promotion of products. The system comprises a sensing unit in its scanner for generating output signals indicative of such codes. First circuitry is operative for receiving the sensing unit output signals and for generating output signals selectively upon correspondence of the code indication in such received signals and the code indications of preselected of such products. Second circuitry is operative for receiving the first circuitry output signals, for storage of promotional messages relating to products, and for generation of output signals indicative of the promotional messages selectively in response to the first circuitry output signals. A display unit is provided for receipt of the second circuitry output signals and for presentation of the promotional messages therein.

In its method for the checkout of products bearing sensible codes indicative and for the promotion of related products, the invention provides the steps of storing codes indicative of preselected of the products for use in such promotion, storing for display promotional messages concerning products, detecting sensible codes of purchased products, comparing such detected codes of purchased products with such stored codes, and displaying the stored promotional messages selectively in accordance with the results of such comparison.

Various changes to the foregoing embodiments and modifications of the described practices may be introduced without departing from the invention. Thus, the particularly depicted embodiments and discussed methods are intended in an illustrative and not in a limiting sense. The true spirit and scope of the invention is set forth in the following claims.

I claim:

1. A system for the checkout of products bearing sensible codes indicative thereof and for the promotion of products responsively to customer decisions, said system comprising:
    (a) sensing means for generating output signals indicative of such codes;
    (b) first circuit means for receiving said sensing means output signals and for generating output signals selectively upon correspondence of the code indication in such received signals and the code indications of preselected of such products;
    (c) second circuit means for receiving said first circuit means output signals, for storage of promotional messages relating to said products, and for generation of output signals indicative of said promotional messages selectively in response to said first circuit means output signals; and
    (d) display means for receipt of said second circuit means output and for presentation of the promotional messages therein, said display means having adaptiveness to customer input to permit system receipt of customer input responsively related to such presented promotional message.

2. The invention claimed in claim 1 wherein said first circuit means comprises a plurality of buffers, each containing signals indicative of the code indication for a distinct one of said preselected products.

3. The invention claimed in claim 2 wherein said first circuit means further comprises a plurality of comparators, each receiving said sensing means output signals and connected individually to one of said buffers for receipt of the signal content thereof.

4. The invention claimed in claim 3 wherein said second circuit means comprises a plurality of storage units, each containing a promotional message concerning a distinct one of said products.

5. The invention claimed in claim 4 wherein each such second circuit means storage unit is connected to a distinct one of said comparators and is further connected to said display means to furnish its contents thereto.

6. A method for the checkout of products bearing sensible codes indicative thereof and for the promotion of related products responsively to customer decisions, said method comprising the steps of:
    (a) storing codes indicative of preselected of said products for use in such promotion;
    (b) storing for display promotional messages concerning said products;
    (c) detecting sensible codes of purchased products;
    (d) comparing such detected codes of purchased products with such stored codes;
    (e) displaying such stored promotional messages selectively in accordance with the results of such comparison; and
    (f) selectively effecting promotion of products indicated in said promotional messages responsively to customer decision following such display of promotional messages.

* * * * *